United States Patent Office 3,238,005
Patented Mar. 1, 1966

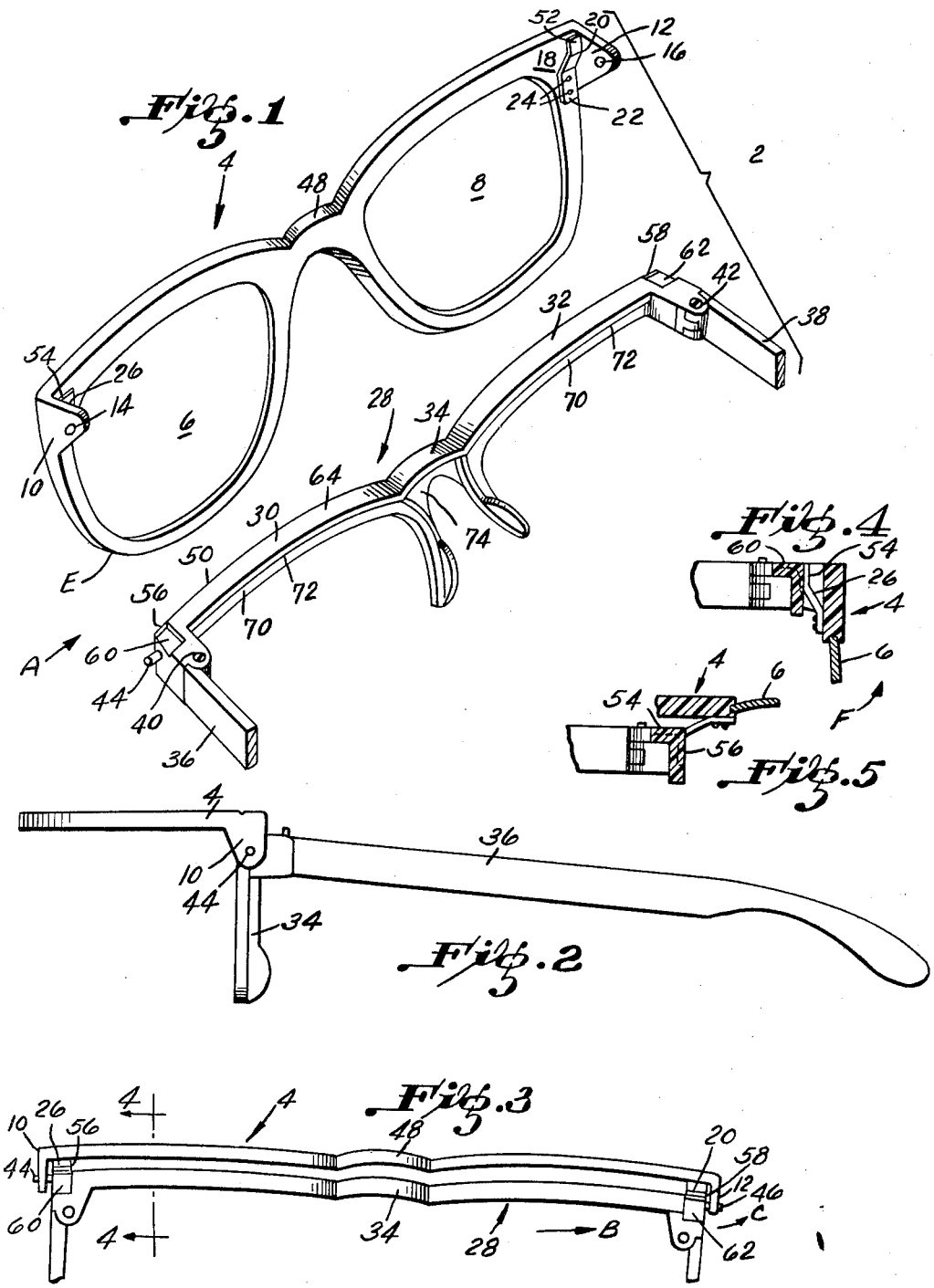

3,238,005
SPECTACLE FRAME COMPRISING A SUPPORT FRAME AND PIVOTED LENS FRAME
Albert C. Petitto, Hudson, Mass., assignor to Foster Grant Co., Inc., Leominster, Mass., a corporation of Delaware
Filed July 30, 1963, Ser. No. 303,194
1 Claim. (Cl. 351—59)

This application is a continuation-in-part of application Serial No. 844,023 filed October 2, 1959, now abandoned and incorporated herein by reference.

This invention relates to an eyeglass frame. More particularly it relates to an adjustable eyeglass frame comprising an outer lens holding frame member supported on an inner frame member for oscillating movement relative thereto.

The invention is especially adapted for use in situations where demands on the eyes change rapidly, thus requiring a lens holding device which can be quickly moved into and out of the line of vision of the wearer, and also which will be firmly maintained in either of its positions.

An object of this invention is to provide an adjustable eyeglass frame which can be alternately swung upwardly and downwardly out of and into the line of vision of the wearer with a minimum of effort and which remains firmly held in position in each of the upward and downward positions.

Another object of my invention is to provide an adjustable eyeglass frame which is prevented from moving past a predetermined upward position so as to prevent it from striking the forehead of the wearer.

Still another object of my invention is to provide an adjustable eyeglass frame which can be manufactured and assembled or disassembled with a minimum of time and expense.

Still another object of my invention is to provide an adjustable eyeglass frame which presents a clean and pleasing appearance.

The foregoing and other objects are achieved in an adjustable eyeglass frame having an outer frame member adapted to hold lenses and an inner support frame which may or may not be adapted to hold lenses, and which mounts the outer frame for oscillating movement from an upward position out of the line of vision of the wearer to a downward position where it is in the line of vision of the wearer. The outer frame member is of substantially similar design as the inner support frame member so that a front view thereof gives the impression of only one frame member when the outer frame member is in its downward position.

The outer lens holding frame has rearwardly extending side wall members which overlap the side portions of the inner support frame in such a manner that the two frames can be quickly and easily assembled by merely flexing the side wall members outwardly, aligning the pivotal connection between the flexible side wall members and the side portions, and releasing the flexible side wall members to allow the pivotal connection to engage; and they may be constructed to be disassembled by merely flexing the side wall members outwardly.

The outer frame is firmly maintained in either of its upward or downward positions by at least one spring mounted on said outer frame and coacting with a guideway on said inner support frame. The spring aids in urging and firmly maintaining the outer frame in either of its two positions. Thus when a force is exerted in the outer frame member to move it from one position to another, the spring, coacting with the guideway, will initially restrain movement and subsequently urge movement of the lens from one position to the other, assuring that the outer frame member is moved to its ultimate position once it has passed the halfway point. Having reached the upper position the outer frame is assured of being positively stopped by reason of the end of the spring striking an abutment on the inner frame at the rear end of the top surface of the guideway.

Other objects and features of my invention will become readily apparent from the following detailed description which is not limiting but merely illustrative of the preferred embodiment of my invention.

FIG. 1 is an exploded view in perspective of my adjustable eyeglass frame.

FIG. 2 is a side elevational view in the direction of arrow A with the outer, lens holding frame member in the upward position.

FIG. 3 is a top plan view of my adjustable eyeglass frame.

FIG. 4 is a fragmentary sectional view taken on line 4—4 of FIG. 3.

FIG. 5 is a fragmentary sectional view similar to the view of FIG. 4 but showing the outer frame in its upward position.

Figure 6:
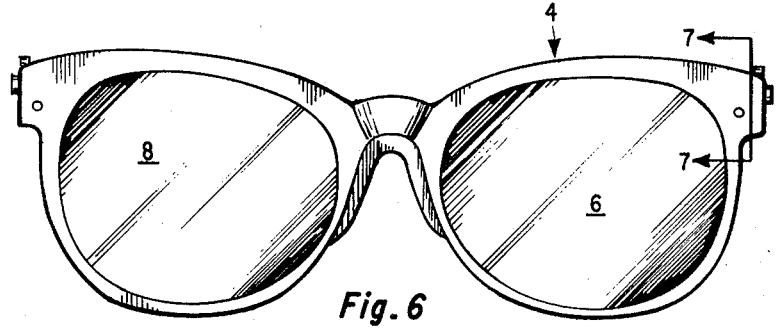
FIG. 6 is a frontal view of the outer frame in the downward position showing how it conceals the inner support frame.
Figure 7:
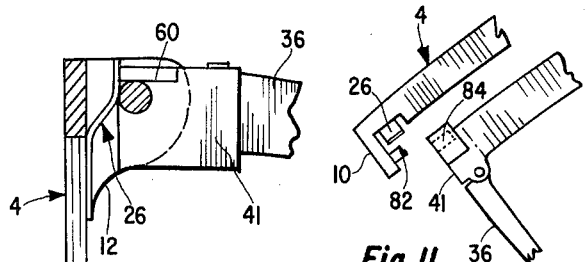
FIG. 7 is a fragmentary sectional view taken along line 7—7 of FIG. 6.

More specifically, the adjustable eyeglass frame 2 includes the outer lens holding frame member 4 having lenses 6 and 8 mounted therein. The lenses 6 and 8 may be designed to meet any number of problems. For example they may be formed of light filtering material to act as sunglasses or welding goggles; or they may be formed of safety glass to protect the eyes of the wearer from foreign objects; or they may be formed of optically ground glass made in accordance with a doctor's prescription. The outer frame member 4 has at each respective end thereof a flexible side wall member 10 and flexible wall member 12 extending toward the face of the wearer preferably being substantially perpendicular thereto. Preferably extending through said side wall projections 10 and 12 are openings 14 and 16. Fixedly mounted on said outer frame member 4 on surface 18 thereof facing the wearer is a flat leaf spring 20, said leaf spring 20 being fixedly attached at its bottom portion 22 to outer frame 4 at its surface 18 by means of rivets 24, 24. Also fixedly mounted on said lens frame member 4 on surface 18 thereof in the same manner as leaf spring 20 is flat leaf spring 26. As is clearly shown in FIGS. 1 and 3, leaf spring 20 is positioned adjacent side wall projection 12, and leaf spring 26 is positioned adjacent side wall projection 10.

Operatively associated with said outer frame member 4 having the lenses 6 and 8 mounted therein and the leaf springs 20 and 26 fixedly mounted on surface 18 thereof, as hereinbefore described, is the inner support frame member 28 for supporting said outer frame member 4 on the face of the wearer. Said inner support frame 28 includes frontal pieces or members 30 and 32, the nose bridge rest 34, side portions 41, 43, and the temples 36 and 38 connected to said side portions 41, 43 respectively, as by hinge means 40 and 42. Lug member 44 is preferably integral with said spectacle-like frame 28 at the side portion 41 and extends outwardly therefrom substantially perpendicularly to temple 36 in the wearing position; and likewise, lug member 46 is preferably integral with said frame 28 at the side portion 43, and likewise extends outwardly therefrom substantially perpendicularly to temple 38 in the wearing position. The nose bridge rest 34 of inner frame 28 is in coinciding relationship with nose bridge rest 48 of outer frame 4 when the outer frame 4 is positioned in its downward position in the line of vision of the wearer.

Both the outer frame member 4 and the inner frame member 28 are preferably formed of a hard, flexible thermoplastic organic material such as nylon thereby making it simple for one to flex the respective members in order to position each of the lugs 44 and 46 into the respective openings 14 and 16 of side-wall members 10 and 12. The lugs 44 and 46 are preferable cylindrically shaped and of such dimensions that they freely support each of the respective side wall members 10 and 12 for pivotal movement. Upon assembly of the outer frame member 4 and the inner support frame 28, as for example, by merely holding outer frame member 4 steady, positioning lug 46 in its respective opening 16, moving said inner frame 28 longitudinally and parallel to member 4 in the direction of arrow B (FIG. 3) to flex side wall projection 12 in the direction of arrow C (FIG. 4), upon frame 28 contacting side wall projection 12, and then inserting lug 44 in opening 14 of side wall projection 10, the free portions 52 and 54 of the leaf spring members 20 and 26 will bear against the surface 50 of frame 28 facing surface 18 of outer frame 4. Likewise, if it is desired to remove the outer frame, either one of the side wall members 10, 12 may be flexed outwardly to remove it from its respective lug and the other side wall member may then be removed from its respective lug.

Figure 8:
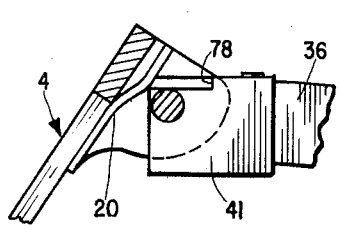
FIG. 8 is a view similar to the view in FIG. 7 showing the outer frame in an intermediate position.

The springs are so formed that the flat outer portions 52, 54 engage the front and top surfaces 56, 58, 60, 62 respectively of the guideways when the outer frame is in its downward and upward positions. Thus, when the outer frame 4 is in its upward or downward position, the springs 20, 26 tend to firmly lock the outer frame in in the respective positions by reason of the fact that the flat outer portions 52, 54 of the springs bear against the flat surfaces 56, 58, 60 62 of the guideway. When the outer frame is moved from one position to another, the flat guide surfaces 56, 58, 60, 62 tend to cam the springs in towards the rear of the outer frame (see FIG. 8). Thus any movement of the outer frame from one positon to another is initially resisted by the spring action of spring 52, 54. After the spring moves past the juncture of the surfaces, it coacts with the subsequent surface to urge the outer frame member into its other position. For example, if the outer frame is moved upwardly from the positon in FIG. 8, the springs 20, 26 will exert a downward force on the top guide surfaces 60, 62 forwardly of the axes of pivot lugs 44, 46 so as to provide a turning moment tending to rotate the outer frame 4 upwardly about the pivot lugs 44, 46. Likewise, if the outer frame 4 is moved downwardly from the position in FIGURE 8, the springs 20, 26 will exert a rearward force against the front guide surfaces 56, 58 at a point above the axes of the pivot lugs 44, 46. Likewise, if the outer frame 4 is moved down- the outer frame downwardly about pivot lugs 44, 46. In this manner the outer frame is urged and firmly locked in either of its ultimate positions.

Figure 9:
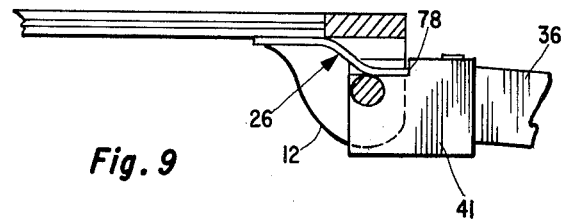
FIG. 9 is a view similar to FIG. 8 showing the outer frame in its upward position.

Furthermore, when the outer frame 4 is moved from the downward position to the upward position, there is a tendency for the wearer of the glasses to push the outer frames too far, causing them to bump against the forehead of the wearer. This movement is prevented by an abutment 78 extending upwardly from the rear of the top horizontal surfaces 60, 62 of each guideway. As the outer frame is moved upwardly to its horizontal position, the ends of the springs 52, 54 strike the abutments 78 (FIG. 9) so as to prevent further upward movement of the outer frame 4.

As is clearly obvious from the description of the device hereinbefore set forth together with the appended drawings, the outer lens holding frame 4 together with the lenses 6 and 8 mounted therein is firmly locked in either position of the frame member 4. The outer lens holding frame may also be easily assembled or detached from the inner support frame by reason of the flexible side wall members when it is desired to utilize another type of lens.

Figure 10:
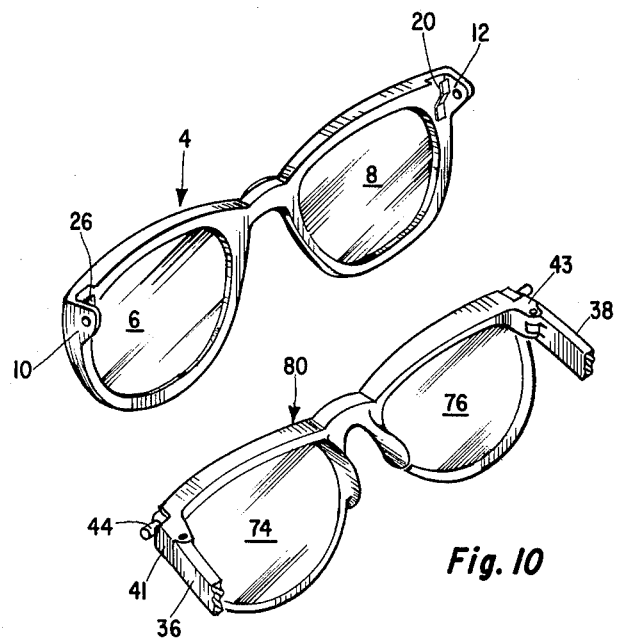
FIG. 10 is an exploded view showing another embodiment in which the inner support frame has lenses mounted therein.

FIG. 10 shows a modification wherein the outer lens holding frame member 4 is used as an attachment for a pair of spectacles 80 having lenses 74, 76. These lenses may be of prescription type or may be eye shielding or shading lenses. The inner frame 80 is formed in substantially the same manner as is frame 28 with the exception that it is a lens holding frame. In this modification the outer frame 4 can be used as a removable attachment for the spectacle frame 80 at the wearer's option.

Figure 11:
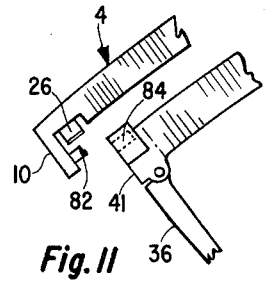
FIG. 11 is a modification showing the pivot lug on the side wall members of the outer support frame, and the openings in the side portion of the inner support frame.

In FIG. 11 the device is shown with lugs 82 being formed on the side wall members 10, 12 instead of on the inner frame side portions 41, 43. In this modification, the openings 84 are formed in the side portions 41, 43 of the inner support frame 28. In this modification, when the outer frame 4 is removed the inner support frame has no projections thereon which would mar the appearance thereof.

As is obvious from the appended drawings, particularly FIG. 1 thereof, the rear portion of frame 28 is formed in the shape of an angle having legs 70 and 72 and has the built-up portion 74 to enable it to rest comfortably on the bridge of the nose of the wearer.

Many alterations and changes may be made without departing from the spirit and scope of this invention which is set forth in the appended claim which are to be construed as broadly as possible in view of the prior art.

What is claimed is:

An eyeglass frame comprising in combination; an outer plastic frame member adapted to hold eyeglass lens; an inner plastic support frame member designed to support the outer frame member on the front thereof; means for connecting the outer frame member to the inner frame member to be reversibly moved from a downward position where it is in the line of vision of the wearer to an upward position out of the line of vision of the wearer; said means comprising flexible side wall members molded integrally with the outer frame member and extending rearwardly from the lateral extremities thereof; said side wall members having horizontally extending openings therein; lugs molded integrally with the inner support frame and extending laterally from the side portions thereof; said side wall members overlapping the side portions of said inner support frame so that the eyeglass frame may be assembled by simply flexing at least one of the side wall members outwardly; aligning said lugs with said openings, and releasing said side wall members to engage said lugs in said side wall openings; at least one spring member having a free end portion extending upwardly and rearwardly from the rear portion of the outer frame; and a guide means including at least one substantially vertical front surface and at least one substantially horizontal top surface extending rearwardly at substantially right angles to said front surface; said spring member coacting with said vertical surface of said guide means to urge and firmly maintain the outer frame in its downward position, said spring member further coacting with said vertical surface of the guide means to initially restrain movement of the outer frame to the upward position; said spring coacting with said horizontal surface of the guide means when the outer frame is moved toward the upward position to urge and firmly maintain the outer frame in the upper positon.

References Cited by the Examiner
UNITED STATES PATENTS

| | | | |
|---|---|---|---|
| 1,599,843 | 9/1926 | Schumacher | 88—53 |
| 1,933,784 | 11/1933 | Wittel | 88—1.5 |
| 2,210,507 | 8/1940 | Spill | 88—53 |
| 2,379,928 | 7/1945 | Rosenheim | 88—53 |
| 2,563,125 | 8/1951 | Malcom | 88—41 |
| 2,582,554 | 1/1952 | Mendelsohn | 2—12 |
| 2,608,905 | 9/1952 | Nelson | 88—53 |
| 2,640,390 | 6/1953 | Muncy | 88—41 |
| 2,986,970 | 6/1961 | Kilgour et al. | 88—41 |

FOREIGN PATENTS 667,640   3/1952   Great Britain.

JEWELL H. PEDERSEN, *Primary Examiner*.